(No Model.)

G. B. ST. JOHN.
PLOW.

No. 410,659. Patented Sept. 10, 1889.

Attest
S. H. Brainerd.
A. T. Brainerd.

Inventor
Garland B. St John,
By J. M. St John,
Atty

UNITED STATES PATENT OFFICE.

GARLAND B. ST. JOHN, OF KALAMAZOO, MICHIGAN.

PLOW.

SPECIFICATION forming part of Letters Patent No. 410,659, dated September 10, 1889.

Application filed January 15, 1889. Serial No. 296,449. (No model.)

*To all whom it may concern:*

Be it known that I, GARLAND B. ST. JOHN, a citizen of the United States, residing at Kalamazoo, in the county of Kalamazoo and State of Michigan, have invented certain new and useful Improvements in Plows; and I do hereby declare the following to be a full, clear, and exact description of the invention, such as will enable others skilled in the art to which it appertains to make and use the same.

This invention relates to plows having a forward wheel running in the furrow in advance of the one being turned; and the object of my invention is to provide means for automatically controlling such wheel, so that it may serve as a guide-wheel for the forward end of the plow while in operation, and as a caster-wheel at other times, and without the use of a lever or other appliance to be manipulated by the operator.

The invention consists in the application to the caster-standard of said forward wheel of a notched cam of peculiar construction, the arrangement of a spring and its traveler so as to operate in connection with said cam, and in the general construction and combination of the supports for said wheel, as will be hereinafter fully set forth and claimed.

Figure 1:
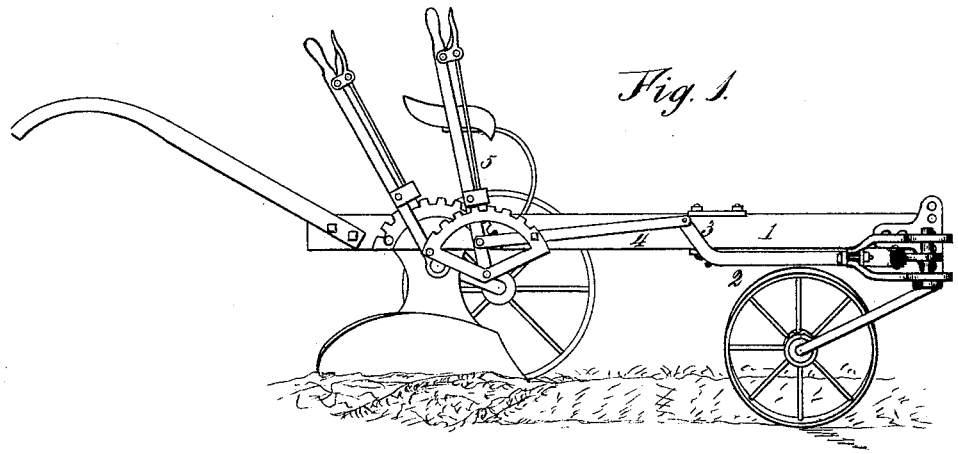
Figure 2:
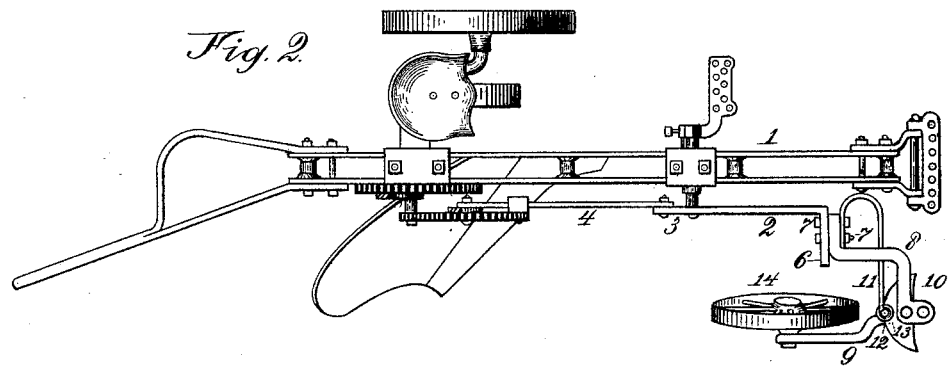
Figures 3, 4:
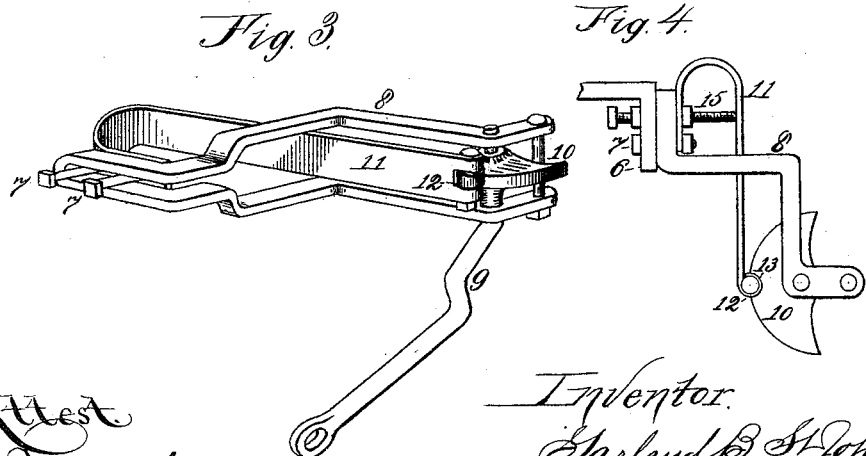

In the accompanying drawings, forming a part of this specification, Figure 1 is a side elevation of a plow embodying my improvements; Fig. 2, a plan view of the same; Fig. 3, a rear view in perspective of the supporting-arm for the forward wheel and its connections; and Fig. 4, a modification of the same, showing a tension device for the spring which holds the caster in position.

Similar figures of reference indicate corresponding parts.

The general characteristics of the plow to which my improvements herein are applied are described in my former application for Letters Patent filed November 22, 1888, and serially numbered 291,607, and the device herein shown and described for controlling the action of the forward wheel is an improvement on that set forth and claimed in said former application.

Referring to the drawings, 1 is the plow-beam, to which is pivotally mounted an arm 2, having a short arm 3 at an angle thereto, which connects by a suitable rod 4 with a hand-lever 5. By means of this lever the wheel is raised or depressed at will. To the forward portion of this arm 6 is secured by suitable bolts 7 a supplemental arm 8, to the forward extremity of which is attached the caster-standard 9. In practice I make this supplemental arm bifurcated, as shown in Figs. 1 and 3, and between the forward extremities of the two members thereof is mounted a cam 10, secured to the upper pivotal part of the caster-standard. Between the two members of the supporting-arm 8 is also mounted a strong flat spring 11 by bolting ali together to the arm 6. The free end of this spring should be provided with a small roller or traveler 12, suitably mounted in the middle thereof and adapted to engage a notch 13 in the central part of the periphery of the cam. This notch, as will be seen, is in the shortest radius of the cam, so that when the cam is turned in either direction from the normal position indicated in the drawings the spring is not only forced out of its notch, but is also carried still farther back by the lengthening radius of the cam. The effect of this is of course to cause the caster to return to normal position whenever in the operation of the plow this is desired.

The operation of the device will be apparent from the foregoing and from the nature of its construction. While plowing, as indicated in Fig. 1, the caster-wheel 14, in its normal position, trails in line with the furrow, being held in that position by the spring and cam, and serves as a guide-wheel for the forward end of the plow. It is to be understood that the lateral pressure on this guide-wheel is not excessive, so that the spring is sufficient to hold it to place, while at the same time flexible enough to allow the caster to turn in plowing around headlands and the like.

The pressure of the spring may be increased to any desired degree by means of a tension, which may be of the style shown in Fig. 4. In this case one of the bolts 15 is elongated, threaded nearly or quite its entire length, and provided with suitable nuts, by means of which the parts are fastened together. The end of the bolt bears on the side of the spring, and by the screwing outwardly of said bolt the pressure of the spring is increased.

Having thus described my invention, what I claim as new, and desire to secure by Letters Patent, is—

1. In a plow, the combination, with a suitable support therefor, of a caster-standard for the forward wheel, a cam on said standard, substantially as described, with a notch therein to receive the traveler of a spring, a spring, substantially as described, with a traveler mounted in its free end and bearing on the periphery of said cam and adapted to engage with the notch therein and hold the caster in normal position, as set forth.

2. In a plow, the combination, with a tilting-arm, of the bifurcated arm 8, the spring 11, mounted between the members of said arm and having traveler 12, the caster-standard 9, and the cam 10, secured thereto between the members of said arm, substantially as and for the purpose set forth.

In testimony whereof I affix my signature in presence of two witnesses.

GARLAND B. ST. JOHN.

Witnesses:
A. J. MILLS,
T. DIDDINGS.